Jan. 13, 1925.

W. H. DAY 1,522,945

MACHINE FOR WRAPPING PACKAGES

Filed Aug. 28, 1922    9 Sheets-Sheet 1

INVENTOR
William Harper Day
by Arthur J. Stenhuse
Attorney.

Jan. 13, 1925.

W. H. DAY 1,522,945

MACHINE FOR WRAPPING PACKAGES

Filed Aug. 28, 1922    9 Sheets-Sheet 2

INVENTOR.
William Harper Day.
by Arthur J. Cushman
Attorney.

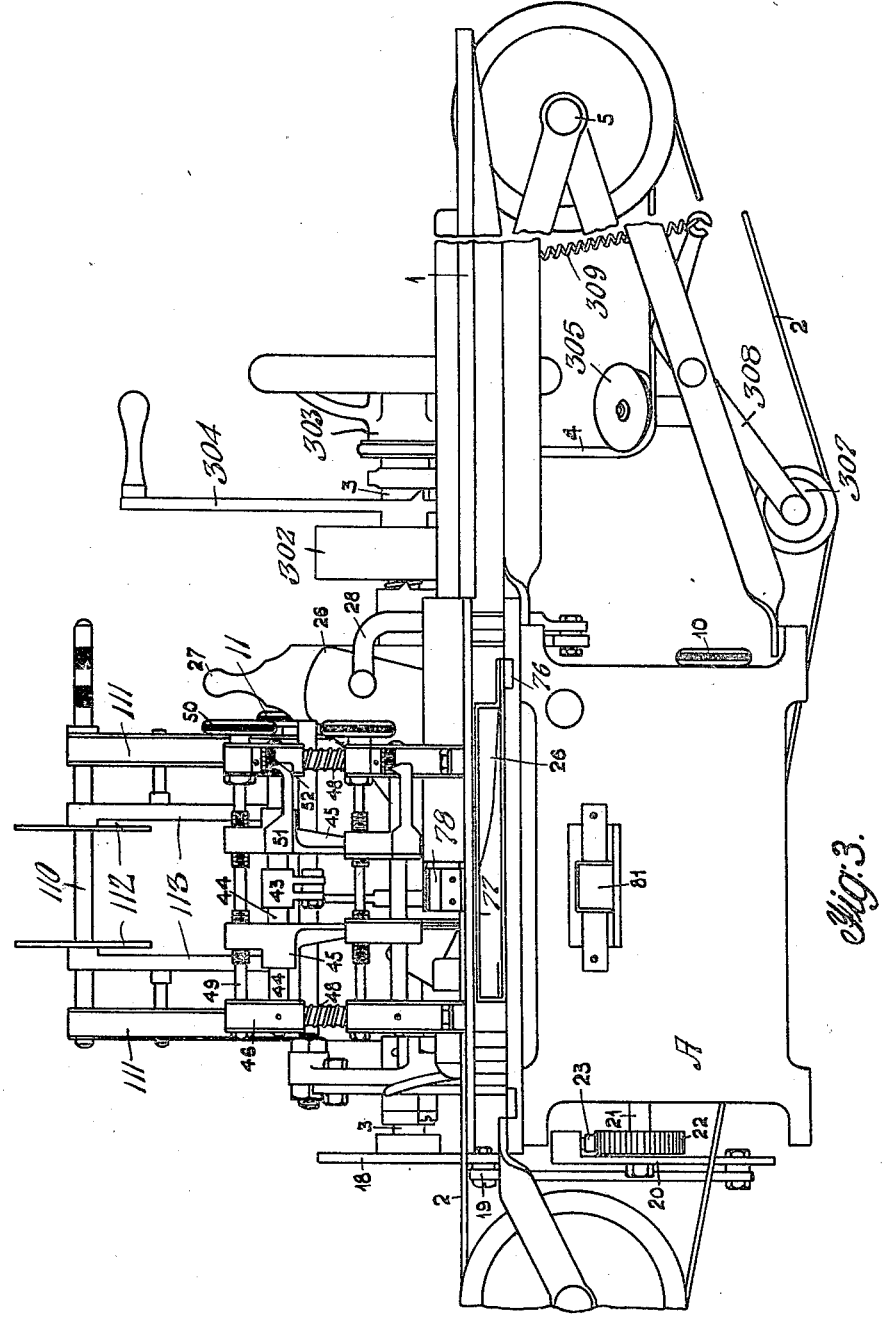

Jan. 13, 1925.

W. H. DAY 1,522,945

MACHINE FOR WRAPPING PACKAGES

Filed Aug. 28, 1922

INVENTOR
William Harper Day.
by Arthur Stephens
Attorney

Jan. 13, 1925.

W. H. DAY 1,522,945

MACHINE FOR WRAPPING PACKAGES

Filed Aug. 28, 1922    9 Sheets-Sheet 5

INVENTOR.
William Harper Day.
by Arthur J. Stephens
Attorney.

Jan. 13, 1925.

W. H. DAY 1,522,945

MACHINE FOR WRAPPING PACKAGES

Filed Aug. 28, 1922

INVENTOR
William Harper Day.
by Arthur Stephens
Attorney.

Jan. 13, 1925.
W. H. DAY
1,522,945
MACHINE FOR WRAPPING PACKAGES
Filed Aug. 28, 1922
9 Sheets-Sheet 7
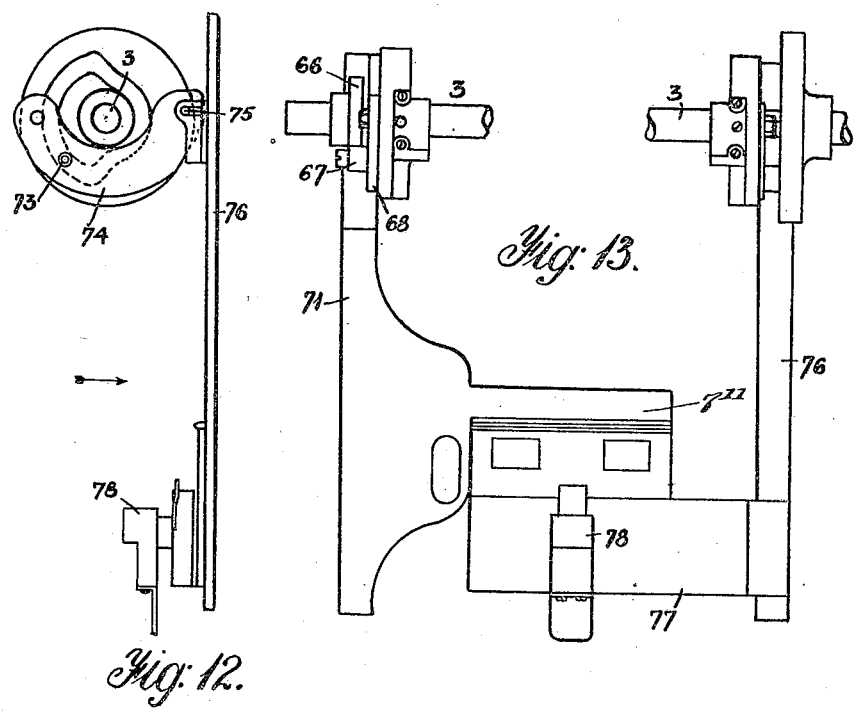
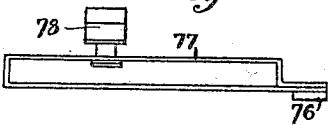
INVENTOR
William Harper Day.
by Arthur J. Stephens
Attorney.

Jan. 13, 1925.
W. H. DAY
MACHINE FOR WRAPPING PACKAGES
Filed Aug. 28, 1922
1,522,945
9 Sheets-Sheet 8
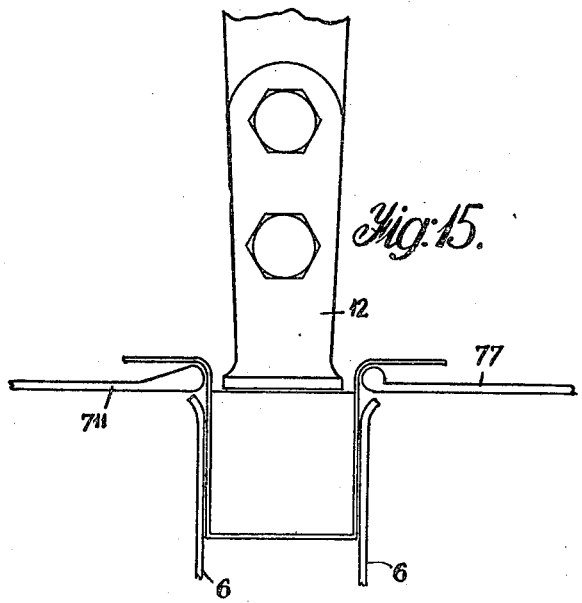
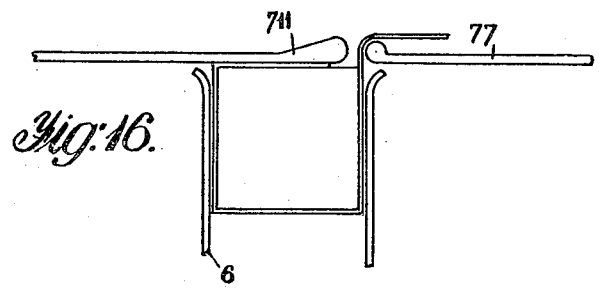
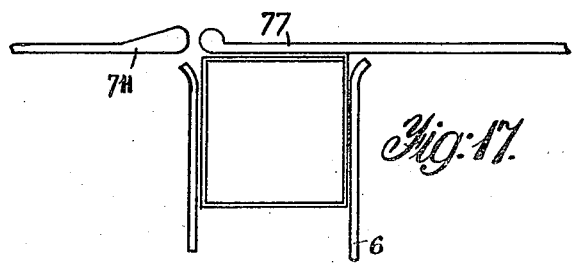
INVENTOR
William Harper Day.
by Arthur J. Lienhaus
Attorney.

Jan. 13, 1925.
W. H. DAY
1,522,945
MACHINE FOR WRAPPING PACKAGES
Filed Aug. 28, 1922     9 Sheets-Sheet 9

INVENTOR
William Harper Day
by Arthur J. Paphus
Attorney

Patented Jan. 13, 1925.

1,522,945

UNITED STATES PATENT OFFICE.

WILLIAM H. DAY, OF HOUNSLOW, ENGLAND.

MACHINE FOR WRAPPING PACKAGES.

Application filed August 28, 1922. Serial No. 584,878.

*To all whom it may concern:*

Be it known that I, WILLIAM HARPER DAY, a subject of the King of Great Britain and Ireland, residing at the Novelty Works, Ivy Road, Hounslow, Middlesex, England, have invented new and useful Improvements in Machines for Wrapping Packages, on which application has been made for Letters Patent in Great Britain, No. 24657, filed 16th September, 1921, of which the following is a specification.

The present invention relates to improvements in those wrapping machines designed for the purpose of wrapping such articles as soap-tablets, cubes of laundry-blue, meat jelly, caramels, chocolates and other foodstuffs and for wrapping rectangular packages, tins, cardboard cartons and the like, and particularly in a wrapping machine designed for those purposes in which a frame is provided with a wrapping well with yielding walls, over the mouth of which well, a web of paper is fed from which a sheet of paper is cut which is wrapped around an article by wrapping blades during the action of depressing said article through the well by a plunger. In this machine the article to be wrapped is fed forward by a feeding member through a guiding channel and deposited upon the sheet of paper in the mouth of the well after the same has been severed from the web by a cutting knife actuated at the desired moment. The article to be wrapped is depressed into the well by the head of a plunger lever actuated from the main cam shaft. This plunger co-acts with a horizontally movable folding blade. In turn this horizontally movable folding blade co-acts with a second horizontally movable folding blade having openings in the edge thereof and means fastened to and projecting in advance of the plunger head for supporting the following article to be wrapped in the well, and top folding blades movable through the openings in the second horizontally disposed blade edge. After the paper has been wrapped around the article in the well by the said blades it is ejected from the well by means of a horizontally sliding member adapted to be moved across the bottom of the well.

The above parts are driven from the main driving shaft by means of cam mechanism and are adjusted to act at predetermined moments to complete the cycle of operations in the desired sequence.

It was proposed to use a hopper into which the articles to be wrapped are fed through the medium of the inclined chute upon a combined supporting plate and feeding member by which the articles are deposited one by one on to the paper in the mouth of the wrapping well.

The present invention comprises various improvements in the above machine.

According to the present invention the articles are continuously fed forward through a guiding channel by an endless band driven from the main shaft of the machine to a position registering with the feeding member which moves said articles off the band into the mouth of the wrapping well. In order to allow of the machine being employed for tablets of different lengths the walls of the channels through which the tablets are passed are made adjustable. Similarly the paper roller supports and paper guides are capable of adjustment so as to take the paper webs of varying widths according to the dimensions of the article to be wrapped in the well. Instead of a pair of feeding rollers on the cam shaft co-acting with an under roller adapted to intermittently engage the paper web, I employ a pair of co-acting rollers mounted in close proximity to the cutting knife and driven intermittently from the cam shaft through pawl and ratchet gearing. These feeding rollers are adapted to have a continuous grip on the paper whether stationary or rotating. I employ a stiff cutting knife with a cutting edge adapted to co-act by a scissors action with a cutting edge on the framework of the machine over which the web of paper passes in its passage to the mouth of the wrapping well. In order to facilitate their adjustment, the top end folders are yoked together and adapted to be actuated from a single cam on the cam shaft through a lever arm arranged on the top of the machine. These top end folders come into action with a downward movement against the influence of compression springs. In order to prevent the paper from being crumpled experience has shown that it is desirable to fold one of the projecting side flaps of paper over the end of the article in the well before the other flap is folded. To provide for this movement the cam slots are so positioned upon the disc that one folding blade is moved forward to its full extent before the other blade is actuated which blade comes forward over the end of the article to be wrapped as the first blade retires.

The invention is illustrated by way of example in the accompanying drawings, in which—

Figure 3 shows a front elevation taken on the left hand side of Figure 1.

Figure 12 shows in side elevation a detail view of the front top folder and plunger mechanism.

Figure 13 shows a plan view of the mechanism shown in Figures 11 and 12 combined looking in the direction of the arrows on these figures.

Figure 14 shows in front elevation a detail view of the front top folder.

Figure 15 shows a detail end view of the article to be wrapped being pressed down into the well by the top plunger.

Figure 16 shows a detail view of the article to be wrapped with the back top folder in operation.

Figure 17 shows a detail end view of the article to be wrapped with the front top folder in operation.

Figure 1:
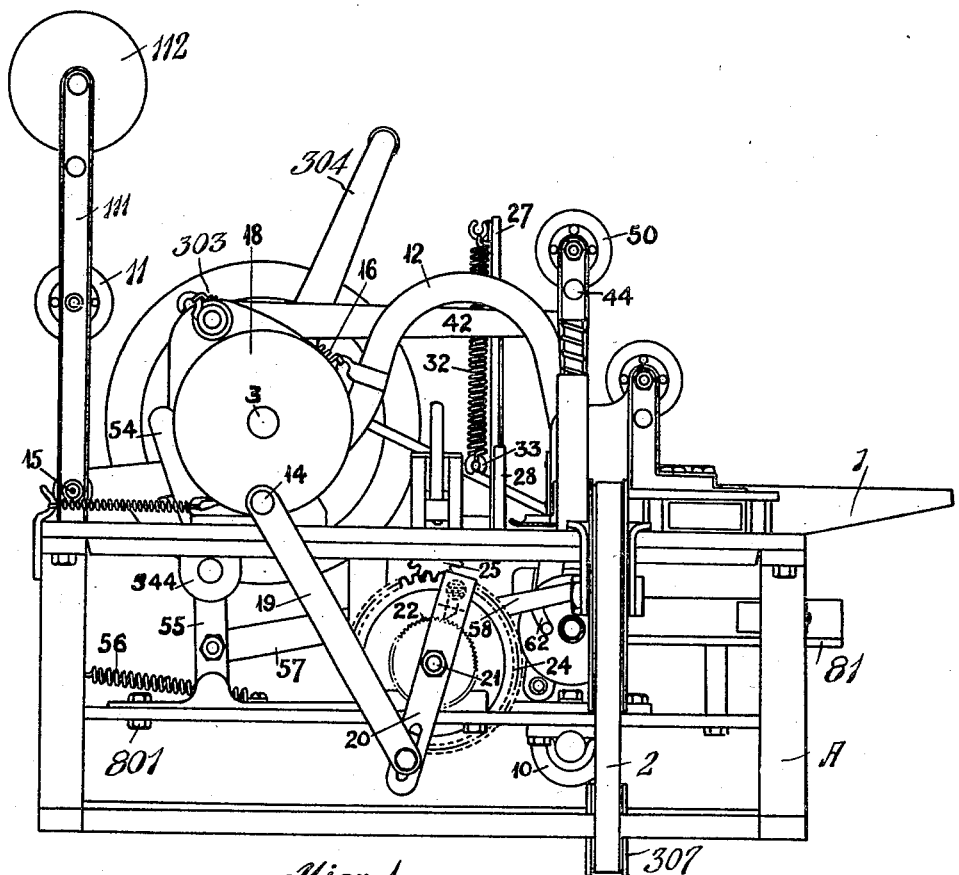
Figure 1 shows a side elevation of the left hand side of the machine.
Figure 2:
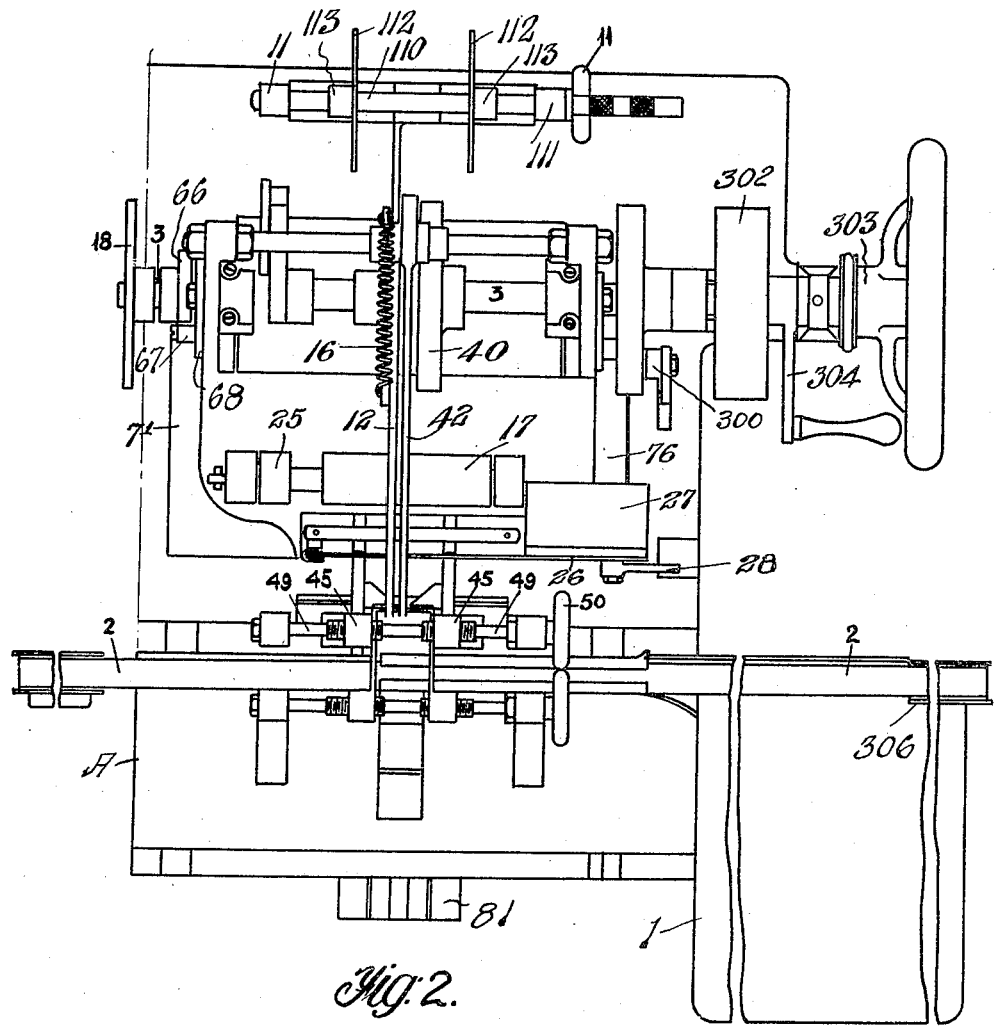
Figure 2 shows a plan view of Figure 1.

As shown in Figures 1, 2 and 3 of the drawings the machine is driven from a convenient source of power by a pulley 302 secured to the main shaft 3, the articles to be wrapped are continuously fed forward through a guiding channel from the tablet plate board 1 secured to the framework A of the machine by an endless band 2. A combined flywheel and pulley 303 is mounted on the main cam shaft 3 and can be coupled thereto by clutch mechanism controlled by a hand lever 304. A belt 4 passes over guide pulleys 305 and over a pulley mounted on the counter-shaft 5 thus rotating the pulley 306 and driving the endless band 2. Tension is maintained in the band 2 by a jockey pulley 307 carried by a pivoted arm 308 acted on by a spring 309. The articles to be wrapped are carried respectively by the belt to a position in which they register in turn with a feeding member 78 shown in detail in Figures 12 and 13 adapted to move the articles to be wrapped off the band into the mouth of the wrapping well. In order to allow of the machine being employed for tablets of different lengths the walls of all the channels through which the articles are passed are made adjustable. The folder members are also adjustable.

Figure 7:
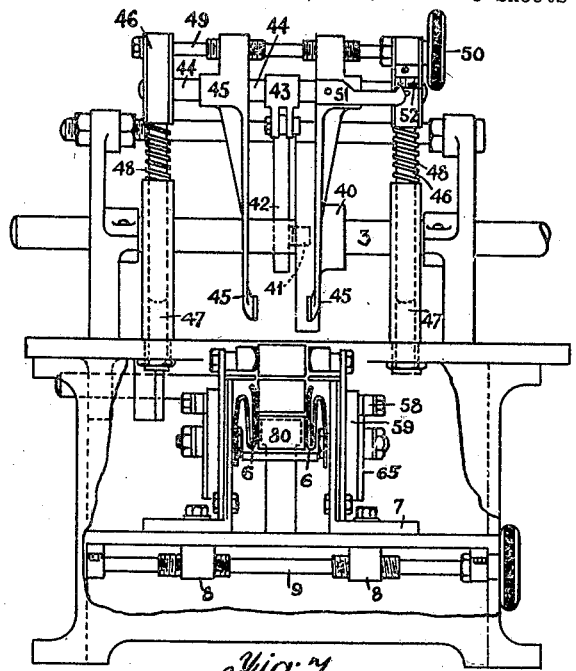
Figure 7 shows a front elevation of Figure 6.

In Figure 7 I illustrate in detail the wrapping well provided with yielding springs 6 adapted to engage the ends of the tablets. These springs are mounted on brackets 7 adapted to be adjusted through the nuts 8 by the adjusting shaft 9 which shaft is turned by the hand wheel 10. In this way the walls of the wrapping well are adjusted to the length of the tablet to be wrapped. The paper holder 110 is carried on supports 111 on the machine framework A and has cheeks 112 supported on brackets 113 controlled by right and left hand screws operated by a hand wheel 11 as shown more particularly in Figures 2 and 3, so as to take a paper web of varying widths according to the dimensions of the articles to be wrapped in the well.

Figure 4:
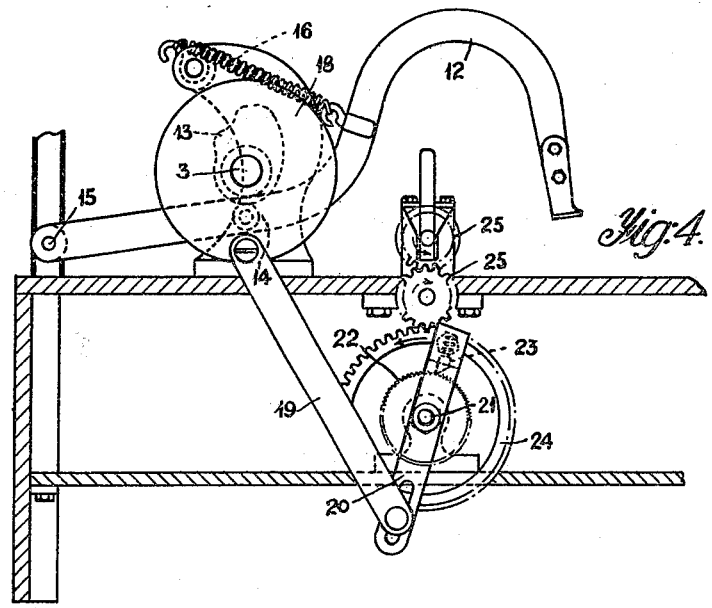
Figure 4 shows in side elevation a detail view of the top plunger and paper feeding mechanism.
Figure 5:
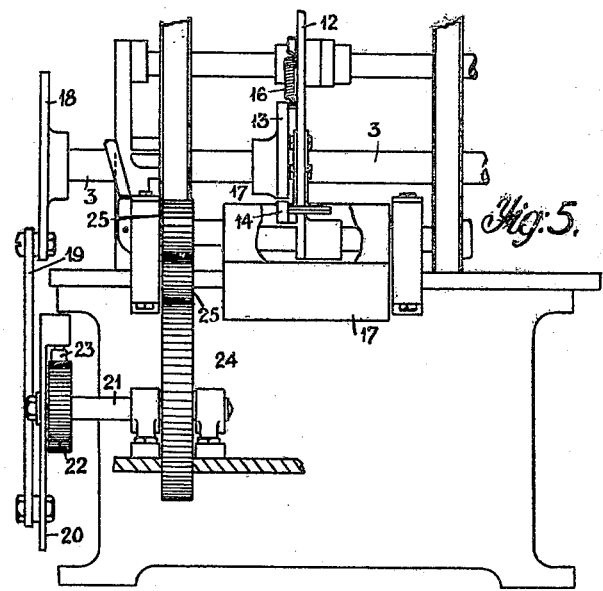
Figure 5 shows a front elevation of Figure 4.

The tablets are fed through the wrapping well by means of a top plunger 12 pivotally mounted at 15. This top plunger 12 is actuated by a cam 13 so as to move synchronously with the bottom plunger hereinafter described. The said cam 13 is mounted in the main operating shaft 3 and is adapted to engage the roller 14 carried by said plunger 12 as shown in Figures 4 and 5. The downward movement of the plunger under the influence of the cam 13 is opposed by the spring 16.

In the machine herein first described a pair of feeding rollers mounted on the cam shaft co-acted with an under roller adapted to intermittently engage the paper web. According to the machine forming the present invention I employ feeding rollers mounted in close proximity to the cutting knife and driven intermittently from the main cam shaft 3 through ratchet gearing.

These feeding rollers 17 are adapted to have a continuous grip on the paper whether they are stationary or rotating. In Figures 4 and 5 I show by way of example a ratchet feeding mechanism for intermittently moving the feeding rollers from the cam shaft 3. A crank disc 18 mounted on the shaft 5 is coupled through the link 19 with an adjustable lever 20 loosely mounted on the spindle 21 of the ratchet wheel 22. The said lever 20 is provided with a pawl 23 adapted to engage the ratchet wheel 22, and to drive through said wheel the spindle 21 and the gear wheel 24 keyed thereon and through said wheel 24 the pinions 25 mounted on the spindles of the feeding rollers 17. In this manner the rotation of the crank disc on the cam shaft 3 gives an intermittent movement to the feeding rollers 17 through the said pawl and ratchet mechanism. The said feeding rollers 17 are adapted to have a continuous grip on the web of paper whether they are stationary or rotating.

I employ a stiff cutting knife with a cutting edge adapted to co-act by a scissors action with a cutting edge 266 on the framework of the machine over which the web of paper passes in its passage to the mouth of the wrapping well.

Figure 8:
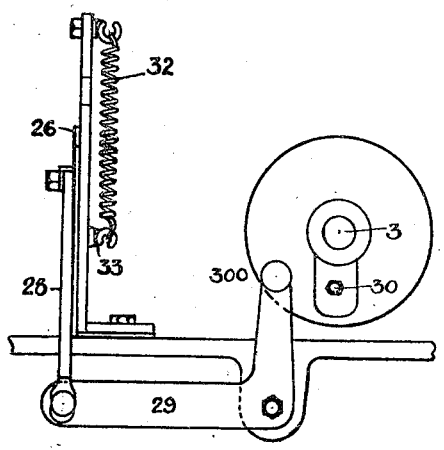
Figure 8 shows in side elevation a detail view of the knife mechanism.
Figure 9:
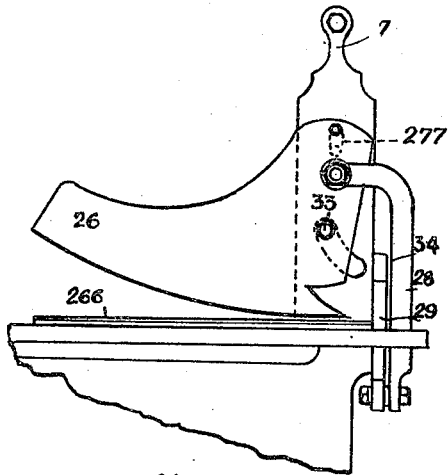
Figure 9 shows a front elevation of Figure 8.
Figure 10:
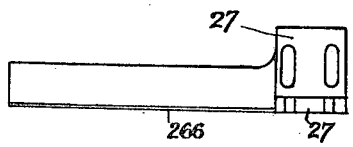
Figure 10 shows a plan view of the fixed bottom blade and knife bracket.

In Figures 8, 9 and 10 I illustrate a suitable mechanism for operating the knife. The knife blade 26 is pivotally mounted in the vertical slot 277 in the bracket 27 and is adapted to be actuated through the connecting link 28 and rocker 29 by the cam 30 mounted on the main shaft 3 at the back of the cam actuating the front top folding mechanism hereinafter described. The knife blade 26 is returned from the cutting position by means of the spring 32 mounted behind the knife bracket 27 and connected with the knife through the pin 33 which projects from the knife blade through the slot 34 cut from the bracket 27. This slot is so shaped as to give the desired turning movement to the point of the knife blade when the knife is pulled down against the influence of the spring 32 by the cam 30 engaging the roller 300 at the free end of the rocker 29.

In order to facilitate their adjustment the top end folders are yoked together and adapted to be actuated from a single cam on the cam shaft through a lever arm arranged on the top of the machine. These top end folders come into action with a downward movement against the influence of compression springs. This mechanism is illustrated by way of example in Figures 6 and 7. The main shaft 3 is provided with a cam 40 adapted to actuate through the roller 41 a crank lever arm 42 the free end of which is connected through a shackle 43 with a shaft 44 which forms a yoke supporting the top end folders 45. This yoking shaft 44 is supported at the ends on guiding rods 46 carried in bearings 47 under the influence of the springs 48. The yoke shaft 44 with the top end folders 45 is pressed downwards by the cam against the influence of the springs 48 and these springs return the yoke shaft to the raised position when said shaft is released by the cam. The top end folders are slidably mounted on the said shaft 44 and are capable of adjustment by the screwed adjusting shaft 49 which shaft is adapted to be turned by the wheel 50. The right hand side folder 45 is conveniently provided with a pointer 51 adapted to indicate on the scale 52 the position to which the folder has been adjusted.

In the machine herein first described, the paper side flaps are simultaneously folded over the sides of the article to be wrapped in the wrapping well by the simultaneous movement towards each other of a pair of folding blades, these folding blades being actuated by cam slots from the main cam shaft and said slots being so positioned as to give the folding blades this movement towards each other at the desired moment.

Figure 6:
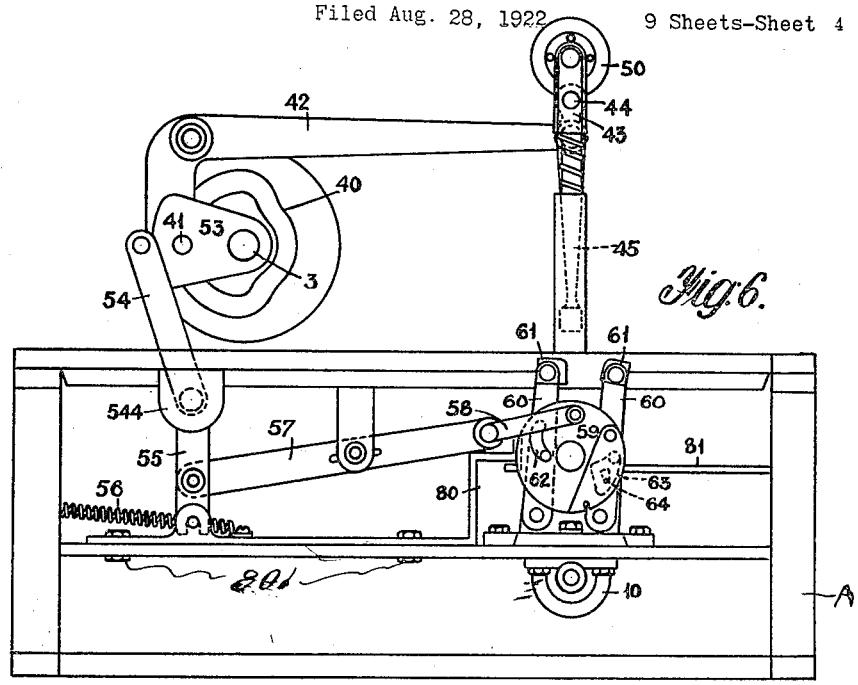
Figure 6 shows in side elevation a detail view of the top end folding mechanism.

In order to prevent the paper from being crumpled, experience has shown that it is desirable to fold one of the projecting side flaps of paper over the end of the article in the well before the other flap is folded. To provide for this movement the cam slots are so formed in the disc that one folding blade is moved forward to its full extent before the other blade is actuated, which blade comes forward over the end of the article to be wrapped as the first blade retires. A suitable side folding mechanism is illustrated by way of example in Figures 6 and 7. The main cam shaft 3 is provided with a cam 53 adapted to engage a roller mounted at the extremity of a crank arm 54 mounted on the rotatable shaft 544 adapted to actuate through the second crank arm 55 against the influence of a spring 56, the links 57 respectively connected by means of a link 58 with a disc 59. Each of these discs is provided with oppositely arranged cam slots adapted to be engaged by the rollers projecting from the arms 60 carrying the side end folders 61. As shown in Figure 6 a cam slot 62 on the left hand side of the disc is a plain slot and is adapted to give a plain backward and forward movement to the arm and folder member 61 in engagement therewith. The opposite cam slot 63 (shown in Figure 6 in dotted lines) is so shaped as to retard the movement of its folder and is provided with a check 64 projecting from the flap lever 65 pivoted to that side of the disc. This check member is adapted to provide that the folder 61 on the right hand side of the disc is so moved in relation to the folder on the left hand side of the disc when the latter folding blade is moved forward to its full extent before the other blade is actuated, which blade then comes forward over the edge of the article to be wrapped as the first blade retires. This movement prevents the paper from being crumpled during this folding process.

Figure 11:
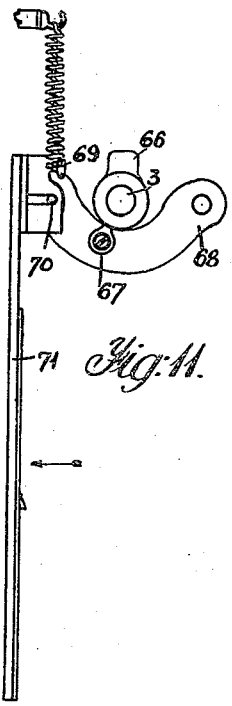
Figure 11 shows in side elevation a detail view of the back top folder mechanism.

In Figures 11, 12 and 13 the back top folder and front top folder and plunger mechanism is illustrated. A cam 66 is mounted on the main cam shaft 3 adapted to engage the roller 67 on the lever 68 connected through the operating stud 70 with the strip 71 attached to the back top folder 711. This back top folder 711 is adapted to be actuated against the influence of the spring 69 hooked to said member in unison with the front top folder operated by the cam 72 through the roller 73 and lever 74 connected through the operating stud 75 with the strip 76 in one with the front top folder 77. The said front top folder is adapted to carry the member 78 adapted to feed the tablets off the endless band into position over the mouth of the wrapping well.

The wrapped articles are fed from the well on to the table 81 and from thence through the exit in the front plate of the machine. This plunger 80 is slidably guided on the framework A by means of bolts 801 which are fixed in the framework and which pass through slots cut in the rear end of the plunger. The plunger is returned by the above mentioned spring 56 which controls the lever mechanism rocking the discs 59 which actuate the end folders 61.

The wrapping operations are illustrated in detail in Figures 15 to 21. In Figure 15 the article to be wrapped is shown being pressed down into the well over the paper between the yielding springs 6 by the top plunger 12. In Figure 16 the back top folder 711 is shown in the forward position and in Figure 17 the back top folder is shown again in the receded position and the front top folder 77 is shown in the forward position. In this position the top flaps of paper have been folded over each other. It should be understood that Figures 15, 16 and 17 are end views of the articles being wrapped in the well.

Figure 18:
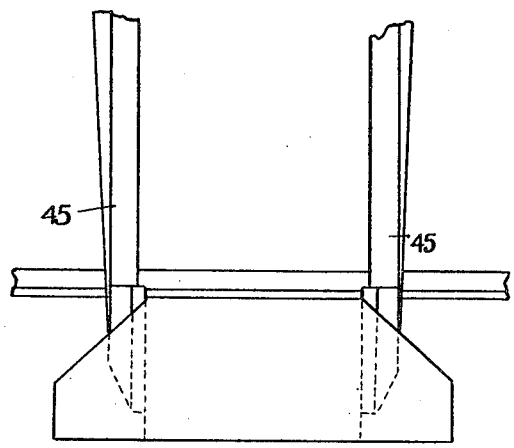
Figure 18 shows a detail front view of the article to be wrapped with the top end folders in operation.
Figure 19:
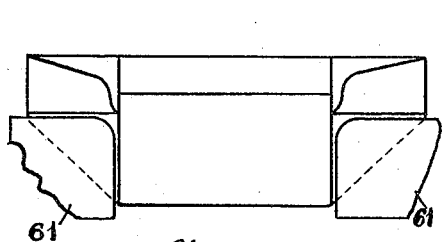
Figure 19 shows a detail plan view of the article to be wrapped during the first operation of the side end folders.
Figure 20:
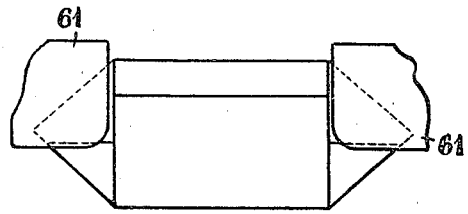
Figure 20 shows a detail front view of the article to be wrapped during the second operation of the side end folders.

Figure 18 shows a front view of the top end folders in the operating position. These folders come into action after the wrapping operations shown in Figures 16 and 17 are completed. Figure 19 shows in plan view the first operation of the side end folders 61 after the top end folders have receded. Figure 20 shows the second operation of the side end folders 61.

Figure 21:
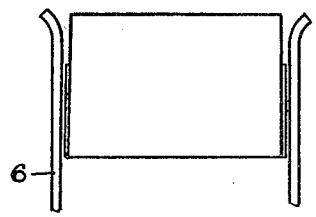
Figure 21 shows a detail front view of the wrapped article in the well with the flaps held in position by the end springs.

Each article pressed into the well by the top plunger 12 pushes the wrapped article beneath it downwards when the yielding springs 6 turn up the pointed end flaps and complete the wrapping as shown in Figure 21. The completely wrapped article finally reaches the table 81 where it is fed by the plunger 80 through the exit in the front plate of the machine.

What I claim is:—

1. In a wrapping machine of the class described herein, adjustable folding mechanism and end walls for each channel through which the packages pass after leaving the hand, and right and left handed screw means for simultaneously and symmetrically adjusting each of said sets of end walls and the folding mechanism.

2. In a wrapping machine of the class described herein, adjustable end walls for each channel through which the packages pass after leaving the hand, an adjustable paper holder for carrying paper webs of varying widths according to the dimensions of the package to be wrapped, and right and left handed screw means for adjusting said channels and said paper holder.

3. In a wrapping machine of the class described herein, the combination with an endless feed belt of an adjustable guide way, right and left handed screw means for adjusting the guide way according to the length of the package to be wrapped, and a member on the front horizontally disposed top folding member adapted to push the packages of said feed belt through said guide way into position over the wrapping well.

4. In a wrapping machine of the class described herein, a pair of guide rods, bearings in which said guide rods work, springs on said guide rods, a yoking shaft supported at its ends on said guide rods, a pair of top end folders mounted on said yoking shaft, right and left hand screw means for simultaneously and symmetrically adjusting said folders, a single lever arm, and a single cam operating said folders through said lever arm and yoking shaft.

5. In a wrapping machine of the class described herein, brackets for carrying the side end folders, right and left handed screw means for simultaneously and symmetrically adjusting said brackets, cam means for operating said folders so that one folding blade at each end of the package moves forward to its fullest extent before the second blade is actuated, which blade comes forward over the end of the package as the first blade retires.

6. In a wrapping machine of the class described herein, brackets for carrying the yielding side walls of the wrapping well and the side end folders, and right and left handed screw means for simultaneously and symmetrically adjusting said brackets, and cam means for operating said folders so that one folding blade at each end of the package moves forward to its fullest extent before the second blade is actuated, which blade comes forward over the end of the package as the first blade retires.

7. In a wrapping machine of the class described herein, brackets for carrying the yielding side walls of the wrapping well, side end folders on said brackets, right and left handed screw means for simultaneously and symmetrically adjusting said brackets, a disc revolubly mounted on each of said brackets having a plain cam slot adapted to give a plain back and forward movement to one folder member and a cam slot and check member projecting from a flap lever pivoted to the side of the disc adapted to retard and check the second folder member in relation to the first folder member so that the first folder member is moved forward to its full extent before the checked folder member acts, and means for oscillating said disc.

In testimony whereof I have signed my name to this specification.

WILLIAM H. DAY.